(12) United States Patent
Bikson et al.

(10) Patent No.: US 12,502,640 B1
(45) Date of Patent: Dec. 23, 2025

(54) APPARATUS AND METHOD FOR PURIFICATION OF GAS MIXTURES

(71) Applicant: Avanpore LLC, Newton, MA (US)

(72) Inventors: Benjamin Bikson, Newton, MA (US); Victor Krasulevich, Riga (LV); Sergei Potekhin, Sharjah (AE); Michael Gulyansky, Jurmala (LV)

(73) Assignee: Avanpore LLC, Newton, MA (US)

(*) Notice: Subject to any disclaimer, the term of this patent is extended or adjusted under 35 U.S.C. 154(b) by 0 days.

(21) Appl. No.: 19/269,585

(22) Filed: Jul. 15, 2025

(51) Int. Cl.
| | |
|---|---|
| *B01D 53/22* | (2006.01) |
| *B01D 63/04* | (2006.01) |
| *C01B 3/50* | (2006.01) |
| *C10L 3/10* | (2006.01) |

(52) U.S. Cl.
CPC ......... B01D 53/226 (2013.01); B01D 63/043 (2013.01); C01B 3/503 (2013.01); C10L 3/102 (2013.01); *B01D 2053/224* (2013.01); *B01D 2256/16* (2013.01); *B01D 2257/304* (2013.01); *B01D 2257/504* (2013.01); *B01D 2313/44* (2013.01); *B01D 2315/24* (2022.08); *B01D 2317/02* (2013.01); *B01D 2319/02* (2013.01); *C01B 2203/0405* (2013.01); *C01P 2006/80* (2013.01)

(58) Field of Classification Search
CPC ............ B01D 53/226; B01D 63/043; B01D 2315/24; B01D 2053/224; B01D 2256/16; B01D 2257/304; B01D 2257/504; B01D 2313/44; B01D 2317/02; B01D 2317/025; B01D 2319/02; B01D 2319/025; C01B 3/503; C10L 3/102
See application file for complete search history.

(56) References Cited

U.S. PATENT DOCUMENTS

| | | | |
|---|---|---|---|
| 3,422,008 | A | 1/1969 | Mclain |
| 3,690,465 | A | 9/1972 | Mcginnis et al. |
| 3,755,034 | A | 8/1973 | Mahon et al. |
| 3,794,468 | A | 2/1974 | Leonard |
| 4,210,536 | A | 7/1980 | Coplan et al. |
| 4,220,535 | A | 9/1980 | Leonard |
| 4,308,654 | A | 1/1982 | Bogart |
| 4,380,460 | A | 4/1983 | Otstot et al. |
| 4,572,446 | A | 2/1986 | Leonard et al. |
| 4,622,143 | A | 11/1986 | Edwards |
| 4,670,145 | A * | 6/1987 | Edwards ............ B01D 63/043 96/9 |
| 4,881,955 | A | 11/1989 | Bikson et al. |
| 4,929,259 | A | 5/1990 | Caskey et al. |
| 4,961,760 | A | 10/1990 | Caskey et al. |

(Continued)

Primary Examiner — Robert Clemente
(74) Attorney, Agent, or Firm — Forge IP, PLLC (57) ABSTRACT

Disclosed are multi-cartridge hollow fiber membrane apparatuses and methods for gas separation using them. Each external pressure type membrane apparatus contains one or more series of cartridges wherein the cartridges within each series are arranged sequentially. The retentate gas generated by each preceding cartridge in the series is used as a feed gas to the next cartridge in the series, and the permeate gas generated by a cartridge following the first cartridge in the series is used as a sweep gas on the permeate side of the preceding cartridge. The multicomponent gas mixture is separated into one or more products by the method of the invention with improved product recovery and/or product purity.

22 Claims, 4 Drawing Sheets

(56) References Cited

U.S. PATENT DOCUMENTS

| | | |
|---|---|---|
| 5,013,437 A | 5/1991 | Trimmer et al. |
| 5,071,552 A * | 12/1991 | Bikson .................. B01D 63/025 |
| | | 210/321.89 |
| 5,211,728 A | 5/1993 | Trimmer |
| 5,264,171 A | 11/1993 | Prasad et al. |
| 5,282,964 A | 2/1994 | Young et al. |
| 5,284,584 A | 2/1994 | Huang et al. |
| 5,383,956 A * | 1/1995 | Prasad .................. B01D 53/226 |
| | | 95/52 |
| 5,598,874 A | 2/1997 | Alei et al. |
| 5,695,702 A | 12/1997 | Niermeyer |
| 5,702,601 A | 12/1997 | Bikson et al. |
| 5,885,454 A | 3/1999 | Yagihashi et al. |
| 5,897,729 A | 4/1999 | Bikson et al. |
| 6,136,073 A | 10/2000 | Coan et al. |
| 6,911,147 B2 | 6/2005 | Espenan et al. |
| 7,172,696 B1 | 2/2007 | Martinez et al. |
| 8,398,755 B2 | 3/2013 | Coan et al. |
| 8,449,659 B2 | 5/2013 | Taylor et al. |
| 9,199,191 B2 | 12/2015 | Fukuda et al. |
| 9,623,369 B2 | 4/2017 | Bikson et al. |
| 9,737,857 B2 | 8/2017 | Karode et al. |
| 9,764,275 B2 | 9/2017 | Schletz et al. |
| 11,318,412 B2 | 5/2022 | Karode |
| 11,958,017 B2 | 4/2024 | Yanagibashi et al. |
| 12,097,468 B2 | 9/2024 | Chen et al. |
| 12,121,864 B2 | 10/2024 | Visser et al. |
| 12,128,360 B2 | 10/2024 | Taguchi et al. |
| 2013/0042755 A1* | 2/2013 | Majumdar .......... C01B 21/0438 |
| | | 95/47 |
| 2020/0197858 A1* | 6/2020 | Karode .................. C10L 3/103 |
| 2020/0197859 A1* | 6/2020 | Karode ................ B01D 69/02 |
| 2020/0246750 A1* | 8/2020 | Coan .................... B01D 53/226 |
| 2021/0198136 A1* | 7/2021 | Jani ...................... B01D 61/029 |
| 2024/0139671 A1* | 5/2024 | Karode ................ B01D 63/043 |
| 2025/0136884 A1* | 5/2025 | O'Brien ............ B01D 53/226 |

* cited by examiner

APPARATUS AND METHOD FOR PURIFICATION OF GAS MIXTURES

FIELD OF THE INVENTION

This invention relates to an apparatus and method for separating and recovering gas components from complex gas mixtures.

BACKGROUND OF THE INVENTION

Membrane-based gas separations are an efficient method of purifying and recovering valuable gas components. The process is applied to the purification of hydrogen-containing gas streams, the removal of acid gases from natural gas and biogas, and nitrogen generation from air, among other applications.

The hollow fiber membrane configuration is the most economical and efficient membrane gas separation configuration. The hollow fiber configuration provides a high membrane area in a volume packaging that is particularly important for high-pressure gas separations by reducing the number of pressure shells, flanges, valves, and the overall skid footprint. The hollow fiber configuration enables a counter-current flow in the membrane device that maximizes pressure differential across the membrane (the driving force) and thus increases gas separation efficiency and productivity.

Hollow fiber membrane devices exhibit a high membrane surface area per volume packaging efficiency and the ability to handle high-throughput gas separations with efficient purification and recovery of key gas components. Hollow fiber cartridges are packaged into a gas separation apparatus that can vary in its design. Several designs are disclosed in the art, as exemplified by the U.S. Pat. Nos. 3,422,008; 3,690,465; 3,755,034; 3,794,468; 4,210,536; 4,220,535; 4,308,654; 4,380,460; 4,572,446; 4,622,143; 4,881,955; 4,961,760; 4,929,259; 5,013,437; 5,211,728; 5,264,171; 5,282,964; 5,284,584; 5,598,874; 5,695,702; 5,702,601; 5,885,454; 5,897,729; 6,136,073; 6,911,147; 7,172,696; 8,398,755; 8,449,659; 9,199,191; 9,623,369; 9,737,857; 9,764,275; 11,318,412; 11,958,017; 12,097,468; 12,121,864, and 12,128,360.

Shell side feed hollow fiber configurations are deployed in gas separation applications with a high feed to permeate cross-membrane differential pressure, while bore side feed configurations are deployed for low feed gas pressure applications. It is known to package multiple hollow fiber membrane cartridges into a single pressure shell for high-pressure feed gas separation applications to improve separation process economics.

It is desirable to construct membrane devices with multiple cartridges housed within a single pressure shell to reduce membrane packaging costs by minimizing the number of flanges, piping connections, and valves. Multi-cartridge device configurations are disclosed in U.S. Pat. Nos. 8,449,659; 9,737,857; 11,318,412; 11,958,017; 12,097,468; and 12,121,864.

The multi-cartridge apparatus is constructed to contain multiple gas separation cartridges in a series in a single pressure shell. The pressure shell typically contains a single feed gas port, a single retentate gas port, and a single or multiple permeate gas ports. The individual cartridges in the apparatus can be of a crossflow or a counter-current flow design configuration. It is known to direct the feed gas into each cartridge separately and to remove the permeate gas generated by each gas separation cartridge via a single common permeate gas conduit. It is also known to direct the feed gas into the cartridges sequentially while removing the permeate gas from each cartridge from the apparatus via a single permeate gas conduit. Although the individual cartridge designs can be of a counter-current configuration, the overall flow configuration of the apparatus is of a crossflow configuration, even if the individual cartridges in the apparatus are of the counter-current configuration. The gas separation efficiency of the apparatus has thus decreased. For the apparatus to exhibit a comprehensive counter-current performance, the permeate gas stream generated by a cartridge in the series of cartridges must be directed to the permeate side of the preceding cartridge and act as a sweep gas.

The multi-cartridge apparatus configurations disclosed in prior art increase the membrane surface area within a single pressure vessel. However, they do not provide the most efficient utilization of counter-current flow feed to permeate in the device. Instead, these designs rely on extensive and complex internal connections that channel the permeate gas from individual cartridges into a common conduit to be removed from the pressure shell via a permeate gas port. This design increases apparatus manufacturing complexity and cost, while also reducing overall separation efficiency.

Thus, there is still a need in the art for a gas separation apparatus containing multiple cartridges in a series that exhibits a counter-current flow configuration between gas flow on the shell side of the hollow fibers and the permeate side of the hollow fibers throughout the entire apparatus.

SUMMARY OF THE INVENTION

It is an object of this invention to provide a multi-cartridge apparatus comprising two or more cartridges with a single feed inlet port, a single retentate outlet, and a permeate outlet port or ports, wherein the apparatus operates substantially in a feed-to-permeate counter-current flow configuration. The apparatus contains two or more cartridges, wherein the permeate gas generated by at least one cartridge in the series serves as a sweep gas on the permeate side of the preceding (downstream) cartridge.

The hollow fiber cartridges of the apparatus of this invention can be identical in the aspects of cartridge design such as length, hollow fiber dimensions and gas separation characteristics. It is also within the scope of the invention to have cartridges within the apparatus that differ in one or multiple design aspects.

In one embodiment of the invention, the cartridges within the multi-cartridge apparatus differ in hollow fiber dimensions. In one example, the last cartridge in the series of cartridges that generates the final retentate gas stream exhibits a smaller outside hollow fiber diameter as compared to the preceding cartridge, providing an increase in membrane area within the apparatus.

In another embodiment of the invention, the cartridges may differ in gas separation characteristics, enabling the efficient removal of multiple contaminants from the feed gas stream. In one such example, the first cartridge in the series removes gas components from the feed gas stream selectively that are harmful to the gas separation membranes in the following cartridges in the series. Some membranes can be negatively affected by a high concentration of water vapors in the feed gas and, thus, water vapors must be preferentially removed by the first cartridge in the series. Other membranes can be negatively affected by heavy hydrocarbons present in the feed gas and, thus, heavy hydrocarbons must be preferentially removed by the first cartridge in the series of cartridges. Thus, the apparatus of this invention enables utilization of hollow fiber membrane cartridges with gas separation characteristics optimized towards the removal of specific gas components, wherein the permeate gas generated by the upstream cartridge is used as a sweep gas on the permeate side of the preceding cartridge.

DETAILED DESCRIPTION OF THE PREFERRED EMBODIMENTS

The apparatus of the present invention comprises multiple membrane gas separation cartridges connected in series, each incorporating gas separation membranes in a hollow fiber configuration. These cartridges are designed with a shell-side feed gas flow pattern, which facilitates operation under high cross-membrane differential pressures.

In the series configuration, the retentate gas from each preceding cartridge functions as the feed gas for the subsequent cartridge. Additionally, beginning with the second cartridge in the series, the permeate gas from each cartridge is employed as a sweep gas on the permeate side of the preceding cartridge, thereby enhancing separation efficiency. The hollow fiber membrane cartridges are primarily configured for counter-current flow. However, for applications where a minimal pressure drop from the feed to the retentate side is desired, a crossflow configuration may be employed in shell-side feed modules.

The apparatus may comprise a single series of interconnected cartridges, two series, or more. Preferably, the apparatus includes a single feed gas inlet, a single retentate gas outlet, and one or two permeate gas outlets.

The feed gas is introduced into the first cartridge of the series and is processed sequentially through the subsequent cartridges, ultimately producing a single retentate product stream and a single permeate product stream.

Within each membrane cartridge, the gas mixture enters through the feed inlet and flows over the outer surfaces of the hollow fibers. The more permeable components selectively permeate through the membrane and are collected as the permeate gas. The less permeable components continue along the shell side and are discharged as retentate gas from the distal end of the cartridge.

The pressure differential across the membrane drives the permeation of gas components within the mixture. Due to differences in permeation rates, selective gas separation is achieved. Gas components with higher permeability preferentially pass through the membrane, forming the permeate gas stream, while the less permeable components are retained and concentrated in the retentate gas stream.

The permeation rate of a gas through a membrane can be described by the following equation:

$$J_i = \frac{P_i}{l} \times (p_{i,f} - p_{i,p})$$

where $J_i$ is the permeate flux of component i, $P_i$ is the permeability coefficient, I is the membrane thickness, $p_i$,f is the partial pressure of component i in the feed, and $p_i$,p is the partial pressure of component i in the permeate.

The gas flux of an individual gas component through the membrane is measured as gas permeance in GPU units (GPU=Gas Permeation Unit) or alternatively in SI units, as follows:

1 GPU=1×10⁻6 $cm^3(STP)/(cm^2 \cdot s \cdot cmHg)$, wherein:
cm³ (STP): Standard cubic centimeters of gas at standard temperature and pressure.
cm: Thickness of the membrane.
cm²: Area of the membrane.
s: Time in seconds.
cmHg: Pressure difference across the membrane (in centimeters of mercury), or the metric units liters/m² hour bar.

The gas separation factor between two gases is commonly expressed as the ratio of individual gas permeances.

Gas separation membranes are fabricated from a range of materials, including polymers, ceramics, and composite structures. Polymeric membranes—such as those made from polysulfone, polyimides, and cellulose acetate—are preferred due to their ease of processing and relatively low cost. Alternative materials, including zeolites, metal-organic frameworks (MOFs), and graphene-based materials, can deliver superior performance and address the inherent limitations of conventional polymeric membranes.

The apparatus and method of this invention are used to recover hydrogen from various industrial gas streams, including ammonia purge gas (containing $H_2$, $N_2$, $NH_3$, Ar), methanol synthesis purge gas, syngas refinery purge streams (containing $H_2$ and hydrocarbons such as $C_nH_m$), petrochemical streams (containing $H_2$, $N_2$, $CH_4$, CO), and for syngas ratio adjustment applications. The apparatus and method of this invention are further used to remove acid gases, such as carbon dioxide and hydrogen sulfide, from natural gas and biogas, among other applications.

Multiple hollow fiber cartridges arranged in series are incorporated into the gas separation apparatus, with the series comprising at least two cartridges. It is particularly advantageous to construct the hollow fiber membrane cartridges using structured hollow fiber configurations. Uniform packing density within such configurations enhances separation efficiency by minimizing gas bypass, channeling, and undesired mixing, while also allowing for effective control of the pressure drop from the feed to the retentate across the device.

Structured hollow fiber devices may be fabricated using techniques such as helical winding, forming, and weaving, as disclosed in U.S. Pat. Nos. 3,690,465; 3,755,034; 3,794,468; 4,210,536; 4,572,446; 4,881,955; 5,264,171; 5,598,874; 5,702,601; 5,897,729; 7,172,696; and 9,623,369.

The hollow fibers are arranged around a centrally located mandrel of circular cross-section, forming a fiber bundle, wherein the mandrel provides structural support. Holes or perforations located at predetermined sections of the mandrel serve as gas ingress or egress points, facilitating controlled flow through the device.

The structured packing of hollow fibers within the cartridge enables efficient counter-current flow operation, wherein the feed gas flows in the direction opposite to that of the permeate gas. This counter-current configuration maximizes the partial pressure gradients across the membrane, thereby enhancing gas separation efficiency and improving the overall productivity of the device.

The hollow fibers used in the construction of cartridges according to the present invention typically have outer diameters ranging from 150 to 500 μm. The cartridges generally have lengths between 1 and 4 meters, with diameters ranging from 2 inches to 12 inches or greater.

The terminal retentate end of the cartridge is also severed to enable unobstructed flow of the sweep gas generated by the cartridge or cartridges arranged sequentially in the series. The distal tubesheet of the last cartridge in the series is not severed. The terminal ends of the cartridge are encapsulated in tubesheets that provide fluid-tight separation between the feed and permeate gas streams. One tubesheet defines the permeate end of the cartridge, while the other defines the retentate end.

The tubesheet at the permeate end is severed to allow unobstructed removal of the permeate gas. Similarly, the retentate end tubesheet is severed to permit the unobstructed flow of sweep gas generated by one or more downstream cartridges arranged in series. The distal retentate end tubesheet of the final cartridge in the series remains unsevered.

The hollow fiber membrane cartridges are preferably configured in an axial flow design to facilitate efficient counter-current flow. In this configuration, the feed gas enters each cartridge at the permeate tubesheet end, while the retentate gas exits at the distal retentate end of the cartridge.

To prevent gas from bypassing the hollow fiber bundle within the cartridge, the substantially cylindrical cartridge is enclosed in an impermeable barrier, except at designated gas inlet and outlet regions. The impermeable barrier preferably consists of a film, hose, tube, tape, or a glass fabric casing impregnated with epoxy resin. Particular preference is given to materials that conform closely to the membrane bundle or structured membrane body, especially shrinkable materials such as polyolefins, polyvinyl chloride (PVC), or polyimides. These materials minimize voids or intermediate spaces between the barrier and the outer surface of the membrane bundle, thereby enhancing separation efficiency.

Figure 1A:
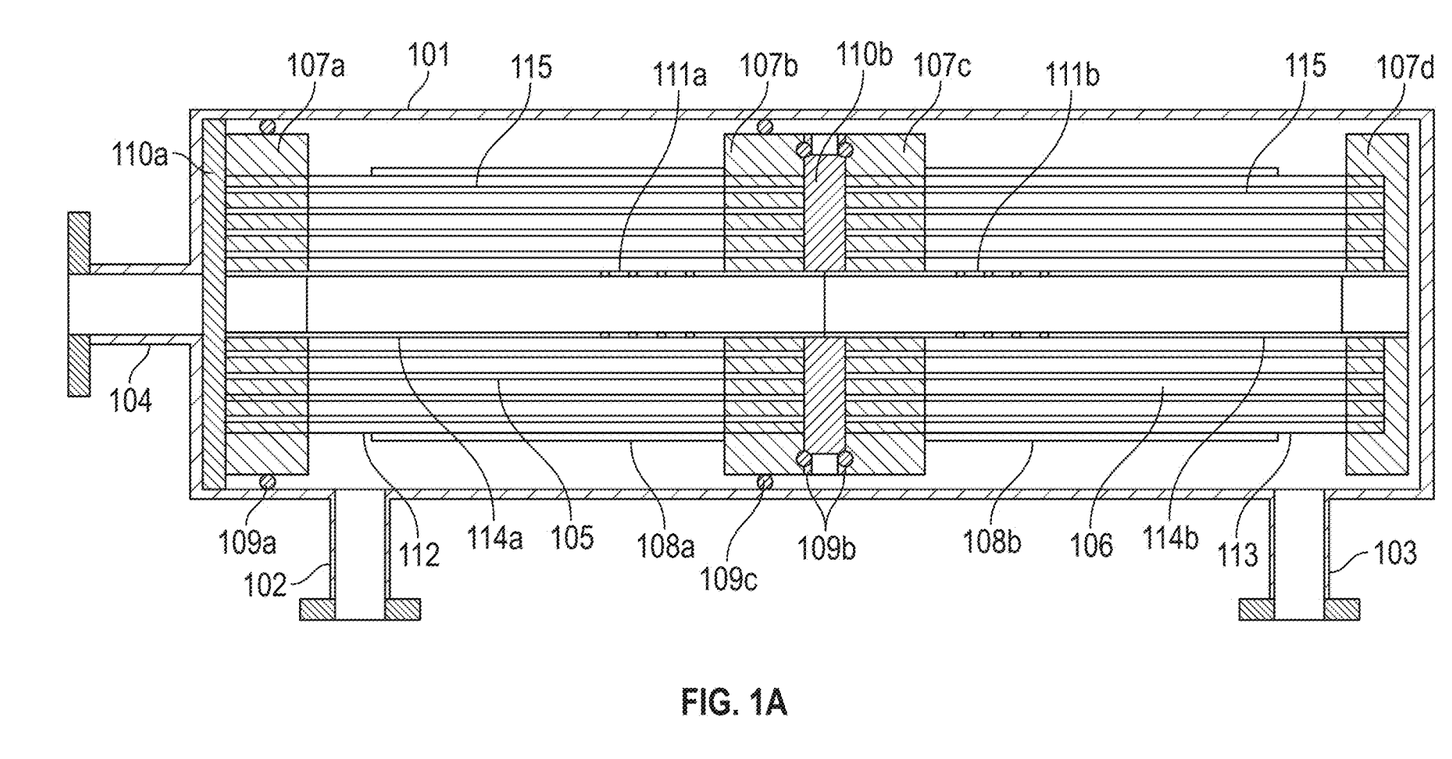
FIG. 1A illustrates a schematic of one exemplary embodiment of the invention, wherein a high-pressure gas mixture containing impurities is treated using an apparatus comprising multiple hollow fiber membrane cartridges arranged in series. This configuration facilitates the purification and recovery of valuable gas components. The apparatus includes two gas separation cartridges connected in series. The retentate gas from the first cartridge serves as the feed gas for the second cartridge. Conversely, the permeate gas from the second cartridge is utilized as a sweep gas on the permeate side of the first cartridge, enhancing separation efficiency. The apparatus is equipped with one feed gas inlet port, one retentate gas outlet port, and one permeate gas outlet port.

One embodiment of an apparatus according to the invention is illustrated schematically in FIG. 1A. A high-pressure feed gas comprising multiple components is processed to produce a permeate gas stream, enriched in the more permeable components, and a retentate stream, enriched in the less permeable components. The permeate stream may include one or more highly permeable gases—such as hydrogen—that are collected as a product. In certain applications, the retentate stream, enriched in less permeable gases—such as natural gas—can also constitute a product. In some gas separation processes, both the permeate and retentate streams are valuable and collected as products.

The apparatus comprises a high-pressure enclosure (101) that houses two hollow fiber membrane cartridges (105) and (106) connected in series. The enclosure (101) is equipped with a feed gas port (102), a retentate gas port (103), and a permeate gas port (104).

The feed gas enters the apparatus through port (102) and undergoes sequential processing by two membrane cartridges. Initially, it passes through the cartridge (105), where partial separation occurs. The resulting retentate is then directed to the cartridge (106) for further separation. The permeate from cartridge (106) is used as a sweep gas along the permeate side of the hollow fiber membranes in cartridge (105), thereby enhancing the overall separation efficiency. The combined permeate streams from both cartridges exit through the permeate port (104), while the final retentate from cartridge (106) is discharged via the retentate port (103).

The cartridges have a cylindrical shape and are constructed using hollow fiber gas separation membranes (115), which are arranged around central mandrels (114a) for cartridge (105) and (114b) for cartridge (106), respectively. The mandrel (114a) includes perforations (111a) at the distal retentate end of the first cartridge (105), which function as the exit conduit for retentate gas processed by the first cartridge. Similarly, the mandrel (114b) features perforations (111b) at the proximate permeate end of the second cartridge (106), serving as the entrance conduit for the retentate gas delivered from the first cartridge (105). The mandrel is constructed from a material that provides mechanical stability and corrosion resistance under the cartridge's operating conditions. Preferred materials include metals such as stainless steel or aluminum, or engineering-grade plastics.

The terminal ends of the cartridges are enclosed by tubesheets. The tubesheets establish a fluid-tight seal that effectively isolates the high-pressure feed gas from the low-pressure permeate gas. The permeate-end tubesheet (107a) of the first cartridge (105) and the permeate-end tubesheet (107c) of the second cartridge (106) are severed to allow unobstructed discharge of permeate gas from the hollow fiber membrane bores. Additionally, the retentate-end tubesheet (107b) of the first cartridge (105) is severed to permit unimpeded entry of the permeate gas—produced by the second cartridge (106)—into the bores of the hollow fibers within the first cartridge (105). In contrast, the retentate-end tubesheet (107d) of the second cartridge (106) remains sealed.

Each permeate tubesheet is supported by a corresponding support element. The permeate tubesheet (107a) of the first cartridge in the series (105) is supported by the support element (110a), which provides mechanical support under high differential pressures and facilitates efficient distribution of the combined permeate gas streams into the permeate port (104). Similarly, the permeate tubesheet (107c) of the second cartridge (106) is supported by the support element (110b), which also designed to withstand high differential pressures and directs the permeate gas streams into the hollow fiber bores of the first membrane cartridge (105) via the tubesheet (107b).

The support element may be configured to occupy most of the cavity beneath the tubesheet, incorporating internal channels or slots to guide and distribute the permeate gas. In certain embodiments, it is constructed from a porous material with internal or external pathways designed to direct the gas flow. Additionally, the tubesheet support may include a woven or nonwoven fabric or a sintered metal plate to further enhance permeate routing.

Cartridge (105) is enclosed by a gas-impermeable barrier (108a), except at the entrance gap (112), which serves as the inlet for the feed gas. Similarly, cartridge (106) is enclosed by a gas-impermeable barrier (108b), except for the gas exit gap (113), which functions as the outlet for the retentate gas. The impermeable barrier preferably comprises a film, hose, tube, or glass fabric tape impregnated with epoxy resin. Materials that conform closely to the hollow fiber membrane bundle are preferred, particularly shrinkable materials such as polyolefins, PVC, or polyimides. The barrier is securely attached to the proximal tubesheet in a fluid-tight manner.

The first cartridge in the series (105) includes a seal (109a) affixed to the cartridge permeate side tubesheet (107a) that ensures a fluid-tight connection between the permeate-side tubesheet (107a) and the inner wall of the apparatus housing. Seals are commonly positioned either within the pressure vessel housing or, more typically, at the permeate end of the membrane cartridge. It is also known to use a two-part sealing system comprising a sealing element and a carrier. In this arrangement, one part forms a seal that closely abuts the inner wall of the module housing once the cartridge is installed, while the other part—serving as the carrier—supports a seal that detachably connects to the front end of the cartridge tubesheet. The seal (109a) effectively separates the feed and permeate gas streams to maintain fluid integrity.

The seal (109c) is affixed to the retentate-side tubesheet (107b) of the cartridge (105) and ensures a fluid-tight connection between the retentate-side tubesheet (107b) and the inner wall of the apparatus housing. It effectively separates the feed and retentate gas streams, thereby maintaining fluid integrity. Alternatively, the seal (109c) can be positioned on the tubesheet (107c) to ensure a fluid-tight connection between the retentate-side tubesheet (107a) and the inner wall of the apparatus housing.

Seals are affixed to tubesheets (107b) and (107c) that provide for a fluid-tight connection between them. The seals ensure a fluid-tight connection between the tubesheets while enabling unobstructed flow of the permeate stream generated by the cartridge (106) to enter hollow fiber bores of the cartridge (105). Alternatively, a sealing member (109b) may be affixed to tubesheets (107b) and (107c) to establish a fluid-tight connection between them. A fluid-tight connection is also present between mandrel (114a) and mandrel (114b) (not shown), allowing unobstructed flow of the retentate gas from cartridge (105) into the feed side of cartridge (106).

Cartridges (105) and (106) may contain hollow fiber membranes with identical gas separation and permeation characteristics. Alternatively, the cartridges may differ in their gas separation properties. Additionally, the hollow fiber membranes in each cartridge may vary in dimensions, including outside and/or inside diameters.

Figure 1B:
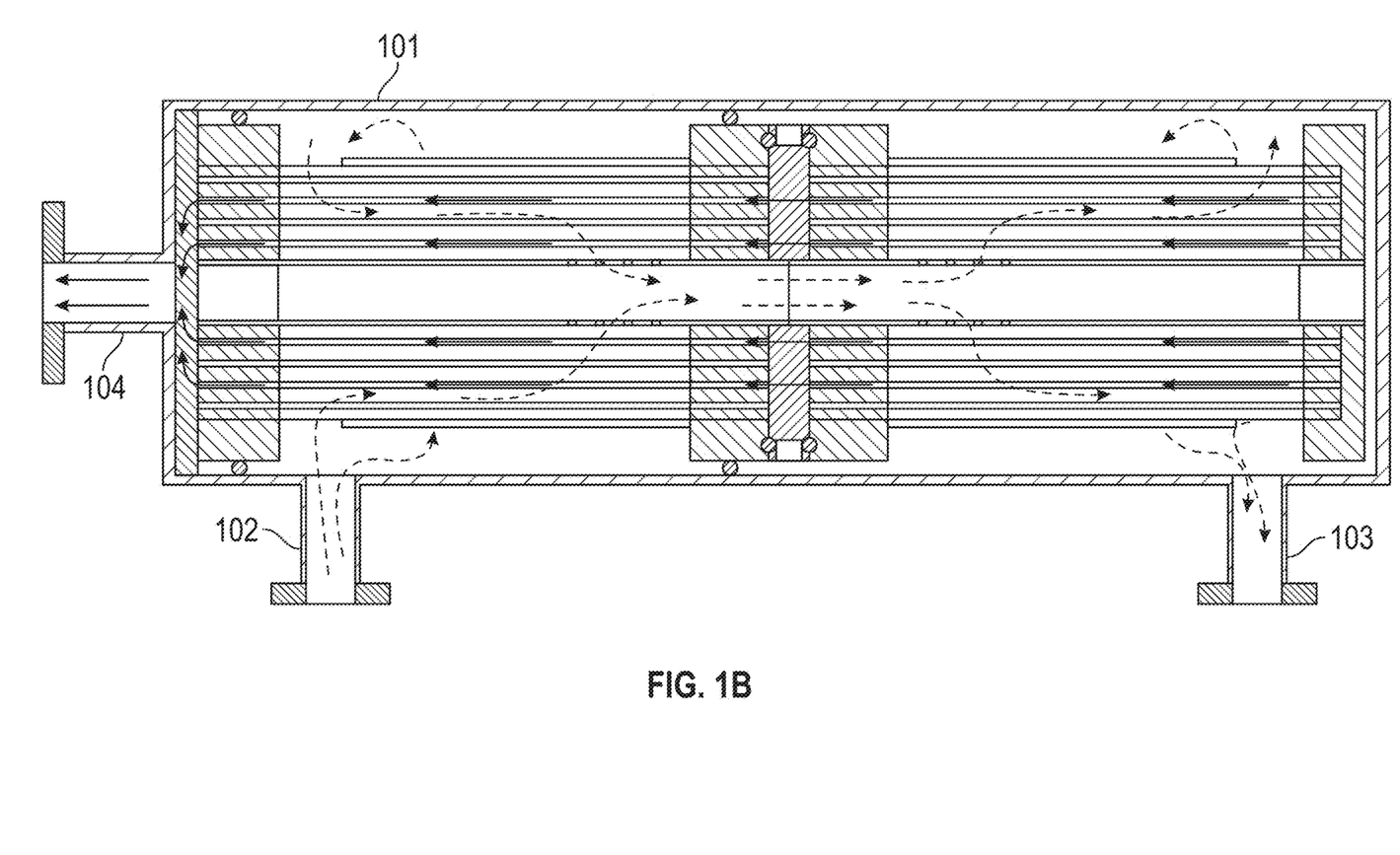
FIG. 1B presents a schematic diagram of the two-cartridge apparatus of FIG. 1A, with directional arrows indicating the flow paths of the feed gas, retentate gas, and permeate gas.

FIG. 1B presents a longitudinal section of apparatus (101), with arrows indicating the flow paths of the feed, retentate, and permeate streams.

Figure 2A:
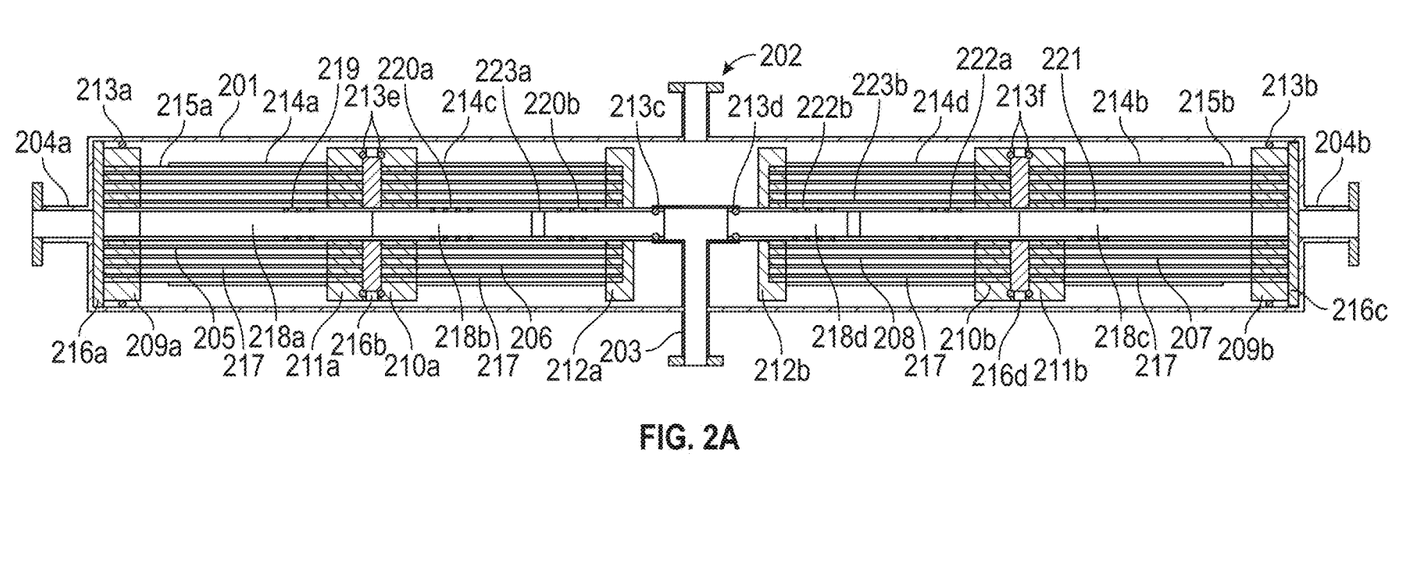
FIG. 2A illustrates a schematic of another exemplary embodiment of the invention, in which a high-pressure gas mixture containing impurities is treated using an apparatus comprising multiple hollow fiber membrane cartridges arranged in two separate series. This configuration is designed for the purification and recovery of valuable gas components. The apparatus includes two distinct series of gas separation cartridges. Within each series, the retentate gas from each preceding cartridge serves as the feed gas for the subsequent cartridge. Furthermore, beginning with the second cartridge in each series, the permeate gas from each cartridge is utilized as a sweep gas on the permeate side of the preceding cartridge. The apparatus features a single feed gas inlet port, one retentate gas outlet port, and two separate permeate gas outlet ports.

In another embodiment, an apparatus according to the invention is illustrated schematically in FIG. 2A. A high-pressure feed gas comprising multiple components is processed to produce a permeate gas stream, enriched in the more permeable components, and a retentate stream, enriched in the less permeable components. The permeate stream may include one or more highly permeable gases—such as hydrogen—that can serve as a product. In certain applications, the retentate stream, enriched in less permeable gases—such as natural gas—can also constitute a product. In some gas separation processes, both the permeate and retentate streams are valuable and collected as products.

The apparatus comprises a high-pressure enclosure (201) that houses four hollow fiber membrane cartridges (205), (206), (207), and (208). The cartridges are connected in two series. Cartridges (205) and (206) form the first series, and cartridges (207) and (208) form the second series. The enclosure (201) is equipped with a feed gas port (202), a retentate gas port (203), and two permeate gas ports (204a and 204b).

The feed gas enters the apparatus through port (202) and undergoes sequential processing by two membrane cartridges in two series in parallel. In the first cartridge series, the feed gas passes initially through the cartridge (205), where partial separation occurs. The resulting retentate gas is then directed to the cartridge (206) for further separation. The permeate from cartridge (206) is used as a sweep gas along the permeate side of the hollow fiber membranes in cartridge (205), thereby enhancing the overall separation efficiency. The combined permeate streams from both cartridges exit through the permeate port (204a), while the final retentate from cartridge (206) is discharged via the retentate port (203).

In the second cartridge series, the feed gas passes initially through the cartridge (207), where partial separation occurs. The resulting retentate gas is then directed to the cartridge (208) for further separation. The permeate from cartridge (208) is used as a sweep gas along the permeate side of the hollow fiber membranes in cartridge (207), thereby enhancing the overall separation efficiency. The combined permeate streams from both cartridges exit through the permeate port (204b), while the final retentate from cartridge (208) is discharged via the retentate port (203).

The cartridges are cylindrical and incorporate hollow fiber gas separation membranes (217) arranged around central mandrels (218a) for cartridge (205), (218b) for cartridge (206), (218c) for cartridge (207), and (218d) for cartridge (208). The mandrel (218a) of the cartridge (205) includes perforations (219) at its distal (retentate) end, which serve as the exit conduit for retentate gas processed by the first cartridge in the first series. Likewise, mandrel (218c) of cartridge (207) includes perforations (221) at its distal (retentate) end, functioning as the exit conduit for retentate gas processed by the first cartridge in the second series.

Mandrel (218b) of the second cartridge (206) in the first series includes perforations (220a) at its proximal (permeate) end, allowing retentate gas from cartridge (205) to enter, and perforations (220b) at its distal (retentate) end, serving as the exit conduit for retentate gas produced by cartridge (206). Similarly, mandrel (218d) of the second cartridge (208) in the second series has perforations (222a) at the proximal (permeate) end to receive retentate gas from cartridge (207), and perforations (222*b*) at the distal (retentate) end for discharging the retentate gas processed by cartridge (208).

The mandrel (218*b*) of the cartridge (206) includes a sealing element (223*a*) that prevents bypass of the gas intended for treatment. The gas enters the cartridge (206) through mandrel perforations (220*a*), and the retentate gas exits through mandrel perforations (220*b*) after treatment. Similarly, the mandrel (218*d*) of the cartridge (208) is equipped with a sealing element (223*b*) that prevents the bypass of the gas to be treated. The gas enters the cartridge (208) via mandrel perforations (222*a*), and the treated retentate gas exits via mandrel perforations (222*b*).

The terminal ends of the cartridges are enclosed by tubesheets. The tubesheets establish a fluid-tight seal that effectively isolates the high-pressure feed gas from the low-pressure permeate gas. The permeate-end tubesheet (209*a*) of the first cartridge (205) and the permeate tubesheet (210*a*) of the second cartridge (206) in the first series of cartridges are severed to allow unobstructed discharge of permeate gas from the hollow fiber membrane bores. The permeate-end tubesheet (209*b*) of the first cartridge (207) and the permeate tubesheet (210*b*) of the second cartridge (208) in the second series of cartridges are also severed to allow unobstructed discharge of permeate gas from the hollow fiber membrane bores. Additionally, the retentate-end tubesheet (211*a*) of the first cartridge (205) in the first series and the retentate-end tubesheet (211*b*) of the first cartridge (207) in the second series are severed to permit unimpeded entry of the permeate gas-produced by the second cartridge (206) in the first series and the second cartridge (208) in the second series-into the bores of the hollow fibers within the first cartridge of each series, respectively. In contrast, the retentate-end tubesheet (212*a*) of the second cartridge (206) in the first series and the retentate-end tubesheet (212*b*) of the second cartridge (208) in the second series remain sealed.

Each permeate tubesheet is supported by a corresponding support element. The permeate tubesheet (209*a*) of the first cartridge in the first series (205) is supported by the support element (216*a*), which provides mechanical support under high differential pressures and facilitates efficient distribution of the combined permeate gas streams into the permeate port (204*a*). Similarly, the permeate tubesheet (209*b*) of the first cartridge in the second series (207) is supported by the support element (216*c*), which provides mechanical support under high differential pressures and facilitates efficient distribution of the combined permeate gas streams into the permeate port (204*b*). The permeate tubesheet (210*a*) of the second cartridge (206) in the first series is supported by the support element (216*b*), which is also designed to withstand high differential pressures and directs the permeate gas streams into the hollow fiber bores of the first membrane cartridge (205) in the first series via the tubesheet (211*a*). Similarly, the permeate tubesheet (210*b*) of the second cartridge (208) in the second series is supported by the support element (216*d*), which is also designed to withstand high differential pressures and directs the permeate gas streams into the hollow fiber bores of the first membrane cartridge (207) in the second series via the tubesheet (211*b*).

The support element may be configured to occupy most of the cavity beneath the tubesheet, incorporating internal channels or slots to guide and distribute the permeate gas. In certain embodiments, it is constructed from a porous material with internal or external pathways designed to direct the gas flow. Additionally, the tubesheet support may include a woven or nonwoven fabric or a sintered metal plate to further enhance permeate routing.

Cartridge (205) is enclosed by a gas-impermeable barrier (214*a*), except at the entrance gap (215*a*), which serves as the inlet for the feed gas. Similarly, cartridge (207) is enclosed by a gas-impermeable barrier (214*b*), except at the entrance gap (215*b*), which serves as the inlet for the feed gas. Cartridge (206) is enclosed by a gas-impermeable barrier (214*c*) that covers the entire length of the cartridge from the tubesheet (210*a*) to the tubesheet (212*a*). Similarly, cartridge (208) is enclosed by a gas-impermeable barrier (214*d*) that covers the entire length of the cartridge from the tubesheet (210*b*) to the tubesheet (212*b*). The impermeable barrier preferably comprises a film, hose, tube, or glass fabric tape impregnated with epoxy resin. Materials that conform closely to the hollow fiber membrane bundle are preferred, particularly shrinkable materials such as polyolefins, PVC, or polyimides. The barrier is securely attached to the proximal tubesheet in a fluid-tight manner.

The first cartridge (205) in the first series of cartridges includes a seal (213*a*) affixed to the cartridge permeate side tubesheet (209*a*) that ensures a fluid-tight connection between the permeate-side tubesheet (209*a*) and the inner wall of the apparatus housing (201). Similarly, the first cartridge (207) in the second series of cartridges includes a seal (213*b*) affixed to the cartridge permeate side tubesheet (209*b*) that ensures a fluid-tight connection between the permeate-side tubesheet (209*b*) and the inner wall of the apparatus housing (201). Seals are commonly positioned either within the pressure vessel housing or, more typically, at the permeate end of the membrane cartridge. It is also known to use a two-part sealing system comprising a sealing element and a carrier. In this arrangement, one part forms a seal that closely abuts the inner wall of the module housing once the cartridge is installed, while the other part-serving as the carrier-supports a seal that detachably connects to the front end of the cartridge tubesheet. Seals (213*a*) and (213*b*) effectively separate the feed and permeate gas streams to maintain fluid integrity.

The seal (213*c*) is affixed to the retentate-end of the mandrel (218*b*) of the cartridge (206) and ensures a fluid-tight connection between the retentate-end of the mandrel (218*b*) and the T-shaped retentate port (203) of the apparatus housing. Similarly, the seal (213*d*) is affixed to the retentate-end of the mandrel (218*d*) of the cartridge (208) and ensures a fluid-tight connection between the retentate-end of the mandrel (218*d*) and the T-shaped retentate port (203) of the apparatus housing. These seals effectively separate the feed and retentate gas streams, thereby maintaining fluid integrity.

Seals (213*e*) are affixed to tubesheets (210*a*) and (211*a*) of the cartridges (205) and (206) in the first series of cartridges that provide for a fluid-tight connection between them. The seals ensure a fluid-tight connection between the tubesheets while enabling unobstructed flow of the permeate stream generated by the cartridge (206) to enter hollow fiber bores of the cartridge (205). Alternatively, a sealing member may be affixed to tubesheets (210*a*) and (211*a*) to establish a fluid-tight connection between them (not shown). A fluid-tight connection is also present between mandrel (218*a*) and mandrel (218*b*) (not shown), allowing unobstructed flow of the retentate gas from cartridge (205) into the feed side of cartridge (206).

Similarly, seals (213*f*) are affixed to tubesheets (210*b*) and (211*b*) of the cartridges (207) and (208) in the second series of cartridges that provide for a fluid-tight connection between them. The seals ensure a fluid-tight connection between the tubesheets while enabling unobstructed flow of the permeate stream generated by the cartridge (208) to enter hollow fiber bores of the cartridge (207). Alternatively, a sealing member may be affixed to tubesheets (210b) and (211b) to establish a fluid-tight connection between them (not shown). A fluid-tight connection is also present between mandrel (218c) and mandrel (218d) (not shown), allowing unobstructed flow of the retentate gas from cartridge (207) into the feed side of cartridge (208).

Cartridges (205), (206), (207) and (208) may contain hollow fiber membranes with identical gas separation and permeation characteristics. Alternatively, the cartridges may differ in their gas separation properties. Additionally, the hollow fiber membranes in each cartridge may vary in dimensions, including outside and/or inside diameters.

The apparatus of the instant invention reduces the number of flanges and related piping as compared to prior art devices while maintaining the desired counter-current flow configuration throughout each cartridge series with a low feed to retentate gas pressure drop.

Figure 2B:
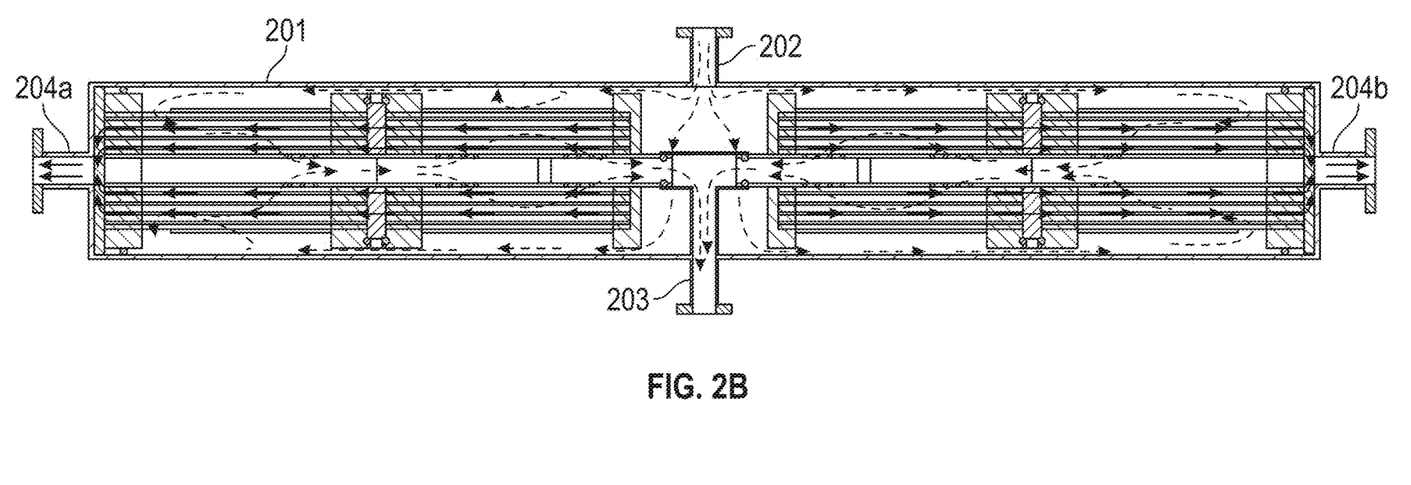
FIG. 2B provides a schematic illustration of the multi-cartridge apparatus of FIG. 2A, with arrows indicating the flow directions of the feed gas, retentate gas, and permeate gas.

FIG. 2B presents a longitudinal section of apparatus (201), with arrows indicating the flow paths of the feed, retentate, and permeate streams.

The following is an example of the method of the invention using cartridges containing hollow fiber membranes that vary in dimensions, i.e., outside and inside diameters, with reference to FIG. 1.

A hydrogen/methane gas mixture was treated by the apparatus of the invention to separate and recover hydrogen as a product. The apparatus contained two membrane cartridges in series, wherein the retentate generated by the first cartridge was treated additionally in the second cartridge, with the permeate generated by the second cartridge used as a sweep on the permeate side of the first cartridge. The cartridges were constructed by a helical winding process and exhibited identical fiber length and packing density throughout the cartridge length and diameter. The cartridges contained hollow fibers that exhibited identical hydrogen gas permeance and hydrogen/methane gas separation factor.

The membrane gas permeance is listed in Table 1.

TABLE 1

| T ref [K] | 294.3 | 313.15 |
|---|---|---|
| Permeance, GPU | | |
| METHANE | 0.681 | 1.320 |
| HYDROGEN | 138.4 | 196.9 |
| α (H2/CH4) | 203 | 149 |
| Ea, kcal/mol | | |
| METHANE | 6.42 | |
| HYDROGEN | 3.42 | |

Process simulation for the three cases was performed: Case 0—both cartridges contained identical dimensions hollow fibers (OD, outside diameter and ID, bore diameter); Case 1—the $1^{st}$ cartridge and the $2^{nd}$ cartridge differed in hollow fiber dimensions; Case 2—the $1^{st}$ cartridge and the $2^{nd}$ cartridge differed in hollow fiber dimensions and cartridge membrane packing density. The small fiber OD enables an increase in cartridge membrane packing density. In all cases, the feed gas composition, pressure, temperature, and the feed flow were identical.

The results for Cases 0, 1, and 2 are presented in Tables 2, 3, and 4, respectively.

TABLE 2

| Parameter | Case 0. Same fiber | | | | |
|---|---|---|---|---|---|
| Stream ID | Feed | Ret 1st | Ret | Sweep | Perm |
| Pressure, barg | 50.0 | 49.9 | 49.9 | 11.2 | 0.5 |
| Temperature, C. | 40.0 | 42.6 | 45.2 | 42.7 | 40.2 |
| Flow, Nm3/h(gas) | 4900.0 | 2899.8 | 1909.7 | 990.1 | 2990.4 |
| Mass Flow, kg/h | 1207.3 | 1022.2 | 924.4 | 97.9 | 283.0 |
| Composition, mol % | | | | | |
| Methane (CH4) | 25.00 | 41.96 | 62.97 | 1.42 | 0.75 |
| Hydrogen (H2) | 75.00 | 58.04 | 37.03 | 98.58 | 99.25 |

TABLE 3

| Parameter | Case 1. Different fiber | | | | |
|---|---|---|---|---|---|
| Stream ID | Feed | Ret 1st | Ret | Sweep | Perm |
| Pressure, barg | 50.0 | 49.9 | 49.8 | 11.5 | 0.5 |
| Temperature, C. | 40.0 | 42.6 | 45.6 | 42.7 | 40.3 |
| Flow, Nm3/h(gas) | 4900.0 | 2907.8 | 1835.9 | 1071.9 | 3064.1 |
| Mass Flow, kg/h | 1207.3 | 1023.0 | 915.7 | 107.3 | 291.6 |
| Composition, mol % | | | | | |
| Methane (CH4) | 25.00 | 41.84 | 65.33 | 1.62 | 0.84 |
| Hydrogen (H2) | 75.00 | 58.16 | 34.67 | 98.38 | 99.16 |

TABLE 4

| Parameter | Case 2. Different fiber | | | | |
|---|---|---|---|---|---|
| Stream ID | Feed | Ret 1st | Ret | Sweep | Perm |
| Pressure, barg | 50.0 | 49.9 | 49.7 | 10.9 | 0.5 |
| Temperature, C. | 40.0 | 42.1 | 46.1 | 42.2 | 40.3 |
| Flow, Nm3/h(gas) | 4900.0 | 3246.3 | 1761.8 | 1484.5 | 3138.1 |
| Mass Flow, kg/h | 1207.3 | 1054.8 | 905.7 | 149.1 | 301.7 |
| Composition, mol % | | | | | |
| Methane (CH4) | 25.00 | 37.55 | 67.77 | 1.68 | 0.99 |
| Hydrogen (H2) | 75.00 | 62.45 | 32.23 | 98.32 | 99.01 |

The process streams in the Tables are marked as follows: Feed—the feed gas directed into the apparatus, Retentate—the retentate stream generated by the apparatus, Permeate—the permeate stream generated by the apparatus, Ret $1^{st}$—the retentate stream generated by the first cartridge, and Sweep—the permeate stream generated by the second cartridge.

TABLE 5

| Parameter | Case 0 | Case 1 | Case 2 |
|---|---|---|---|
| Hydrogen recovery, % | 86.4 | 88.1 | 90.0 |
| Perm dP, bar | 7.14 | 7.57 | 8.42 |
| 1st cartridge | | | |
| Fiber OD, mm | 380 | 380 | 380 |
| Fiber ID, mm | 180 | 180 | 180 |
| Fiber length, m | 1.885 | 1.885 | 1.483 |
| Bundle length, m | 1.525 | 1.525 | 1.2 |
| Bundle OD, mm | 150 | 150 | 150 |
| Fiber packing, % | 45 | 45 | 45 |
| Membrane area, m² | 139.7 | 139.7 | 109.9 |
| 2nd cartridge | | | |
| Fiber OD, mm | 380 | 340 | 310 |
| Fiber ID, mm | 180 | 160 | 140 |
| Fiber length, m | 1.885 | 1.885 | 2.287 |
| Bundle length, m | 1.525 | 1.525 | 1.85 |

TABLE 5-continued

| Parameter | Case 0 | Case 1 | Case 2 |
|---|---|---|---|
| Bundle OD, mm | 150 | 150 | 150 |
| Fiber packing, % | 45 | 48 | 52 |
| Membrane area, m$^2$ | 139.7 | 166.5 | 240.0 |
| Total membrane area, m$^2$ | 279.4 | 306.2 | 349.9 |
| Total membrane area, ft$^2$ | 3007 | 3296 | 3766 |

The method of the invention generated a permeate hydrogen product with a purity of 99%. The use of cartridges equipped with hollow fiber membranes of two different dimensions, in combination with a higher membrane packing density, provided an additional advantage of a higher hydrogen recovery of 90%.

Although the invention has been described with reference to a particular arrangement of parts, features and the like, these are not intended to exhaust all possible arrangements or features, and indeed many other modifications and variations will be ascertainable to those of skill in the art.

The invention claimed is:

1. A gas separation apparatus comprising a sequence of two or more hollow fiber membrane cartridges housed within a pressure shell, the pressure shell having a single feed gas entrance port, a single permeate gas exit port and a single retentate gas exit port;
    wherein each cartridge comprises hollow fibers, a feed gas entrance and a retentate gas exit on a shell side of the hollow fibers, and a permeate gas exit on a bore side of the hollow fibers;
    wherein retentate gas generated by each cartridge in the sequence of cartridges is used as feed gas for a next cartridge in the sequence, and the retentate gas from a last cartridge in the sequence is removed as a retentate product gas from the retentate gas exit port;
    wherein permeate gas generated by each cartridge in the sequence of cartridges following a first cartridge in the sequence is directed into bores of hollow fibers in a preceding cartridge and is used as a sweep gas on a permeate side of the hollow fibers; and
    wherein each permeate gas stream is enriched in at least one fast gas permeable component, and each retentate stream is depleted of said at least one fast gas permeable component.

2. The gas separation apparatus of claim 1, wherein all cartridges in the sequence of cartridges operate substantially in a counter-current flow configuration between the shell side and bore side gas streams.

3. The gas separation apparatus of claim 1, wherein each cartridge is encased in a gas impermeable barrier except in a gas entrance region or a gas exit region.

4. The gas separation apparatus of claim 1, wherein at least one cartridge in the sequence of cartridges operates substantially in a cross-flow configuration between the feed gas and the retentate gas streams.

5. The gas separation apparatus of claim 1, wherein the apparatus is configured to separate and recover hydrogen from a hydrogen-containing gas stream, or to remove acid gases from a natural gas or biogas stream.

6. The gas separation apparatus of claim 1, wherein a hollow fiber dimension in at least one cartridge differs from a corresponding hollow fiber dimension in another cartridge in the sequence.

7. The gas separation apparatus of claim 1, wherein gas separation characteristics of the hollow fiber membrane in at least one cartridge differ from gas separation characteristics of the hollow fiber membrane in another cartridge in the sequence of cartridges.

8. The gas separation apparatus of claim 1, wherein a length of the apparatus is 4 meters or longer.

9. The apparatus of claim 1, wherein two cartridges are housed in the pressure shell.

10. A method for separation of at least one gas component from a mixture of gases, said method comprising the steps of:
    (i) feeding the mixture of gases at a pressure between 5 barg and 150 barg into a feed gas port of a pressure shell containing a plurality of hollow fiber membrane gas separation cartridges, each of which cartridges comprises hollow fiber membranes;
    (ii) passing the mixture of gases into a first of the plurality of hollow fiber membrane gas separation cartridges on a shell side of the hollow fiber membranes, wherein the hollow fiber membranes in the first cartridge remove a portion of at least one first fast gas permeable component from the gas mixture, thereby forming a retentate first effluent stream having a lower concentration of the at least one first fast gas permeable component and a permeate first effluent stream enriched in the at least one first fast gas permeable component as compared to the mixture of gases, and wherein the gas streams on the shell side of the hollow fiber membranes in the first cartridge and the gas streams on a bore side of the hollow fiber membranes in the first cartridge are flowed substantially in a counter-current flow pattern;
    (iii) passing the retentate first effluent stream to a second of the plurality of hollow fiber membrane gas separation cartridges, wherein the hollow fiber membranes in the second cartridge remove a portion of at least one second fast gas permeable component from the retentate first effluent stream, thereby forming a retentate second effluent stream having a lower concentration of the at least one second fast gas permeable component and a permeate second effluent stream enriched in the at least one second fast gas permeable component as compared to the retentate first effluent stream, and wherein the gas streams on a shell side of the hollow fiber membranes in the second cartridge and the gas streams on a bore side of the hollow fiber membranes in the second cartridge are flowed substantially in a counter-current flow pattern;
    (iv) directing the permeate second effluent stream into bores of the hollow fiber membranes of the first cartridge, wherein the permeate second effluent stream acts as sweep gas and is combined with the permeate first effluent stream;
    (v) collecting the retentate second effluent stream from a retentate exit port in the pressure shell; and
    (vi) collecting the combined permeate first effluent stream and permeate second effluent stream from a permeate exit port in the pressure shell at a pressure lower than the pressure at which the mixture of gases are fed in step (i).

11. The method of claim 10, wherein the method is configured to separate and recover hydrogen from a hydrogen-containing gas stream, or to remove acid gases from a natural gas or biogas stream.

12. The method of claim 10, wherein a hollow fiber dimension in the second cartridge differs from a corresponding hollow fiber dimension in the first cartridge.

13. The method of claim 10, wherein gas separation characteristics of the hollow fiber membrane in the first cartridge differ from gas separation characteristics of the hollow fiber membrane in the second cartridge.

14. The method of claim 10, wherein the plurality of hollow fiber membrane gas separation cartridges further comprises a third hollow fiber membrane gas separation cartridge in the pressure shell positioned sequentially to the second cartridge, and wherein the retentate second effluent stream is passed to the third cartridge;
wherein a hollow fiber membrane in the third cartridge removes a portion of at least one third fast gas permeable component from the retentate second effluent stream, thereby forming a retentate third effluent stream having a lower concentration of the at least one third fast gas permeable component and a permeate third effluent stream enriched in the at least one third fast permeable component as compared to the retentate second effluent gas stream, and
wherein the permeate third effluent stream is directed into bores of the hollow fiber membranes of the second cartridge, wherein the permeate third effluent stream acts as a sweep gas, and is combined with the permeate second effluent stream.

15. The method of claim 14, wherein the gas streams on a shell side of the hollow fiber membranes in the third cartridge and the gas streams on a bore side of the hollow fiber membranes in the third cartridge are flowed substantially in a counter-current flow pattern against each other.

16. A gas separation apparatus comprising four or more hollow fiber membrane cartridges arranged into two connected cartridge sequences housed within a pressure shell, each sequence of cartridges comprising two or more cartridges, and the pressure shell having a single feed gas entrance port, a single retentate gas exit port and two permeate gas exit ports;
wherein each cartridge comprises hollow fibers, a feed gas entrance and a retentate gas exit on a shell side of the hollow fibers, and a permeate gas exit on a bore side of the hollow fibers;
wherein retentate gas generated by each cartridge in the first sequence of cartridges is used as feed gas for a next cartridge in the first sequence, and the retentate gas from a last cartridge in the first sequence is removed as a retentate product gas from the retentate gas exit port; and
wherein permeate gas generated by each cartridge in the first sequence following a first cartridge in the first sequence is directed into bores of hollow fibers in a preceding cartridge and is used as a sweep gas on a permeate side of the hollow fibers and a combined stream of permeate gasses is removed from a first of the two permeate gas exit ports in the pressure shell; and
wherein retentate gas generated by each cartridge in the second sequence of cartridges is used as feed gas for a next cartridge in the second sequence, and the retentate gas from a last cartridge in the second sequence is removed as a retentate product gas from the retentate gas exit port; and
wherein permeate gas generated by each cartridge in the second sequence following a first cartridge in the second sequence is directed into bores of hollow fibers in a preceding cartridge and is used as a sweep gas on a permeate side of the hollow fibers and a combined stream of permeate gases is removed from a second of the permeate gas exit ports in the pressure shell; and
wherein each permeate gas stream is enriched in at least one fast gas permeable component, and each retentate stream is depleted of said at least one fast gas permeable component.

17. The gas separation apparatus of claim 16, wherein all cartridges in the two connected cartridge sequences operate substantially in a counter-current flow configuration between the shell side and bore side gas streams.

18. The gas separation apparatus of claim 17, wherein each cartridge is encased in a gas impermeable barrier except in a gas entrance region or a gas exit region.

19. The gas separation apparatus of claim 16, wherein at least one cartridge in the two connected cartridge sequences operates substantially in a cross-flow configuration between the feed gas and the retentate gas streams.

20. The gas separation apparatus of claim 16, wherein the apparatus is configured to separate and recover hydrogen from a hydrogen-containing gas stream, or to remove acid gases from a natural gas or biogas stream.

21. The gas separation apparatus of claim 16, wherein a hollow fiber dimension in at least one cartridge differs from a corresponding hollow fiber dimension in another cartridge in the two connected cartridge sequences.

22. The gas separation apparatus of claim 16, wherein gas separation characteristics of the hollow fiber membrane in at least one cartridge differ from gas separation characteristics of the hollow fiber membrane in another cartridge in the two connected cartridge sequences.

* * * * *